(12) United States Patent
Zhang et al.

(10) Patent No.: US 7,831,325 B1
(45) Date of Patent: Nov. 9, 2010

(54) COMPUTING ESTIMATED PERFORMANCE OF A SOFTWARE APPLICATION IN A TARGET SYSTEM

(75) Inventors: Alex X. Zhang, San Jose, CA (US); Fereydoon F. Safai, Los Altos Hills, CA (US); Richard Stormo, Union City, CA (US); Dirk M. Beyer, Walnut Creek, CA (US); Yunhong Zhou, Sunnyvale, CA (US); Jerry Z. Shan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1605 days.

(21) Appl. No.: 11/108,247

(22) Filed: Apr. 18, 2005

(51) Int. Cl.
G06F 19/00 (2006.01)
G06F 9/45 (2006.01)
G06F 9/46 (2006.01)

(52) U.S. Cl. .................... 700/108; 703/22; 718/104
(58) Field of Classification Search ............... 717/124, 717/131, 138; 718/104, 105, 157, 164, 165; 703/22
See application file for complete search history.

(56) References Cited

U.S. PATENT DOCUMENTS

| | | | |
|---|---|---|---|
| 6,314,463 B1 * | 11/2001 | Abbott et al. ............... 709/224 |
| 7,421,691 B1 * | 9/2008 | Hancock et al. ............. 718/100 |
| 2002/0099910 A1 * | 7/2002 | Shah .......................... 711/117 |
| 2003/0018952 A1 | 1/2003 | Roetzheim | |
| 2005/0015641 A1 | 1/2005 | Alur et al. | |
| 2006/0225079 A1 * | 10/2006 | Nayak et al. ................ 718/105 |

OTHER PUBLICATIONS

Daniel A. Menasce, Virgilio A.F. Almeida, "Capacity Planning for Web Performance, Metrics, Models, & Methods", 1998, Prentice Hall, p. 116, 156, 161, 162, 166, 200, 201, 213, and 216.*
Andrew S. Tanenbaum, "Structured Computer Organization", 1999, Prentice Hall, 4th Edition, p. 541-543.*
SPEC, "SPEC CPU95 Results—Results", Mar. 2000 and prior. Example of SPECint benchmarks.*
SPEC, "SPEC CPU2000 Results—Results", 4th Q 2003 and prior. Example of SPECint benchmarks.*
web.archive.org, "SPEC Query" screen snapshots, 2004, http://web.archive.org/web/20040412203515/www.spec.org/cpu2000/results/.*
BEA Systems, Inc., "BEA WebLogic Server," Rel. 8.1 (Jun. 16, 2003), pp. 1-54.

* cited by examiner

Primary Examiner—Wei Y Zhen
Assistant Examiner—Chung Cheng (57) ABSTRACT

User input regarding a target system on which a software application is to be deployed is received. A benchmark system from plural candidate benchmark systems is matched to the target system. An estimated performance of the software application on the target system or an estimated utilization of resources of the target system by the software application is computed based on information relating to the matched benchmark system.

25 Claims, 3 Drawing Sheets

COMPUTING ESTIMATED PERFORMANCE OF A SOFTWARE APPLICATION IN A TARGET SYSTEM

BACKGROUND

In some organizations, such as companies, universities, or other organizations, shared platforms are used on which multiple software applications are executable. The shared platform often includes multiple servers, where each server includes one or multiple central processing units (CPUs).

Once a software application is deployed on a shared platform, the performance and capacity requirements of the deployed software application can be monitored by conventional monitoring products. The capacity requirements of a software application refer to the resources of the shared platform (such as processing capacity, memory capacity, and so forth) that are to be utilized by the software application during execution under given conditions (e.g., number of users, shared platform configuration). Determining the performance and capacity requirements of a software application after deployment is usually an inefficient technique of determining the resource needs of the software application. In some cases, an administrator of a shared platform may wish to know in advance, at a pre-installation stage before deployment of a particular software application, what the capacity requirements are of a particular software application so that the administrator can properly plan for the deployment of multiple software applications on the shared platform. However, at the pre-installation stage, a software application to be deployed has not yet been tested on the target shared platform, and as a result, performance data relating to the software application is not yet available. Conventionally, tools have not been provided to enable an accurate and efficient determination of capacity requirements of a software application prior to installation of the software application on a target platform.

DETAILED DESCRIPTION

Figure 1:
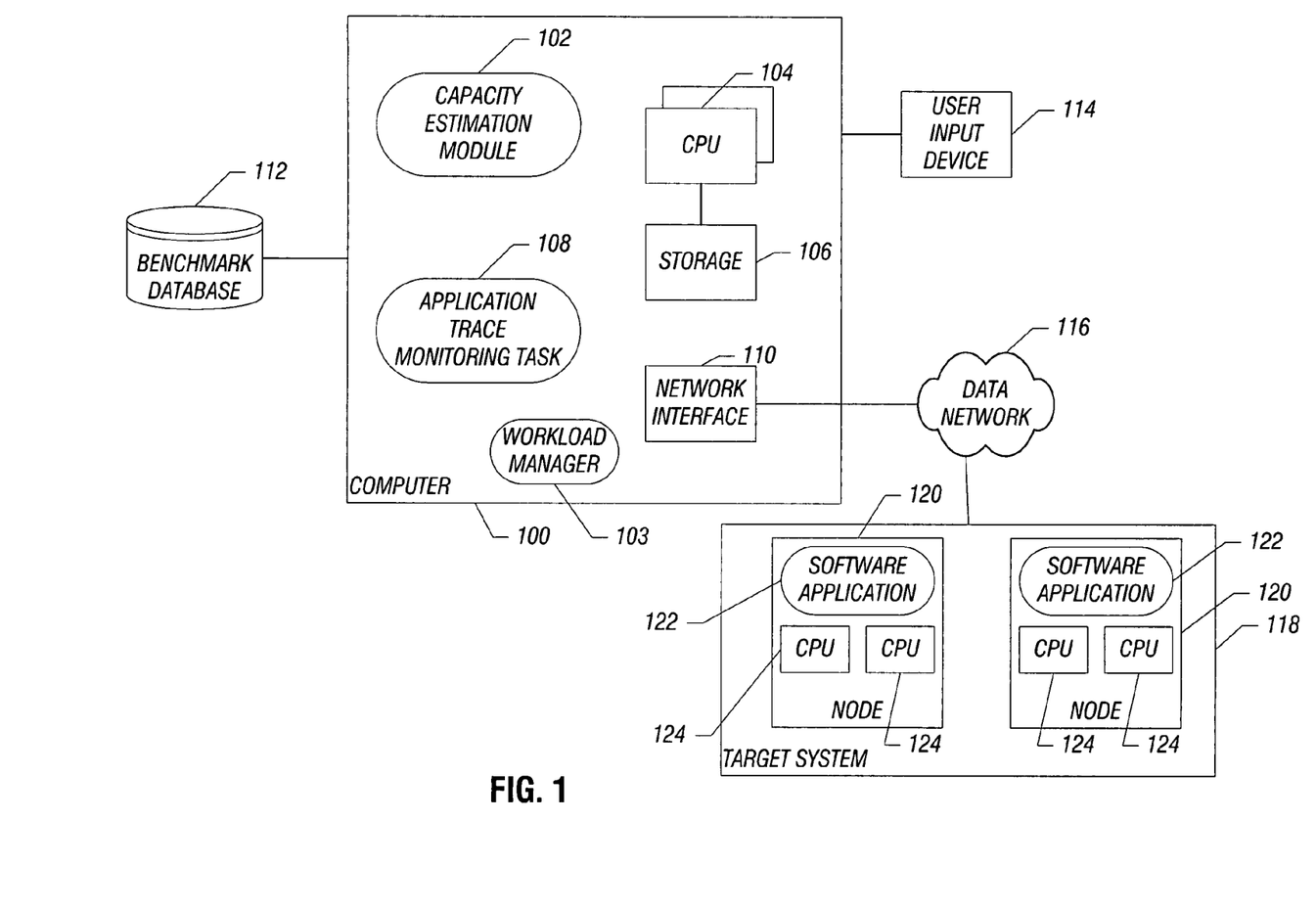
FIG. 1 is a block diagram of an example environment that includes a computer and a target system, where the computer includes a capacity estimation module according to an embodiment of the invention.

FIG. 1 illustrates an example environment that includes a computer 100 on which a capacity estimation module 102 according to an embodiment is executable. The capacity estimation module 102 is capable of determining, at a pre-installation stage, the expected resource utilization of a target software application to be deployed on a target system, such as target system 118. The term "pre-installation stage" refers to the stage prior to installation and deployment of the target software application, such as target software application 122, on the target system 118.

In the embodiment depicted in FIG. 1, the capacity estimation module 102 is a software module executable on one or more central processing units (CPUs) 104 that are coupled to storage 106. In a different embodiment, the capacity estimation module 102 can be implemented in hardware or hardware and firmware. The storage 106 includes volatile memory (such as dynamic random access memories or static random access memories), persistent storage (such as magnetic or optical disk drives or non-volatile semiconductor memory devices), or other types of storage devices.

In the example depicted in FIG. 1, the target system 118 has multiple nodes 120, with each node having one or multiple CPUs 124. The target software application 122 can be deployed for execution on each of the nodes 120. In a different example, the target system 118 can be a single-node, or even a single-CPU, system. The target system 118 is an example of a shared platform on which multiple software applications can be deployed. A "shared platform" refers to any computer platform on which multiple software applications can be deployed for execution. Each deployed software application on the shared platform has resource utilization (or capacity) requirements that take up a share of the target platform capacity. The terms "resource utilization requirements" and "capacity requirements" are used interchangeably and refer to a share of resources of the target system expected to be used by a target software application deployed on the target system under predetermined conditions (e.g., number of users of the target software application, the hardware and software environment of the target system, and so forth).

The target system 118 is coupled over a data network 116 to the computer 100. Note that multiple target systems can be coupled to the computer 100 over the data network 116 to enable the capacity estimation module 102 to determine resource utilization by target software applications on the multiple target systems.

The computer 100 includes a network interface 110 to enable communication by the computer 100 over the data network 116. A user input device 114 is coupled to the computer 100. The user input device 114 allows a user to provide input parameters into the computer 100 for use by the capacity estimation module 102 for estimating capacity requirements of a target software application to be deployed on the target system 118 (at the pre-installation stage). Estimating capacity requirements of a target software application on a target system involves computing an estimated or expected utilization of resources of the target system by the target software application once the target software application is deployed.

The computer 100 also includes a workload manager 103 that works with the capacity estimation module 102 to allocate an efficient share of resources of the target system 118 to the target software application. The workload manager 103 factors in queuing time and capacity requirements of other software applications to be deployed on the target system 118 in calculating the share of resources to be allocated to the target software application.

The computer 100 also includes an application trace monitoring task 108 that is executable on the CPU(s) 104. The application trace monitoring task 108 is able to communicate with components in the target system 118 to monitor the performance and capacity utilization of the target software application 122 that has been deployed in the target system 118. Based on the monitoring performed by the application trace monitoring task 108, feedback is provided to the capacity estimation module 102. The capacity estimation module 102 uses the feedback from the application trace monitoring task 108 to adjust one or more user-input parameters to enhance accuracy for future capacity estimation analysis of the target software application 122 to be deployed on another target system.

The computer 100 is also coupled to a benchmark database 112, which contains information associated with various benchmark systems. Benchmark systems are systems having known configurations and known performances. Information in the benchmark database 112 is matched by the capacity estimation module 102 as closely as possible to the target system 118 to select a benchmark system from among plural candidate benchmark systems that most closely resembles the target system 118. The benchmark database 112 also includes information pertaining to benchmark software applications. The target software application 122 is compared to a benchmark software application to determine an application complexity factor that is provided as an input to the capacity estimation module 102.

Figure 2:
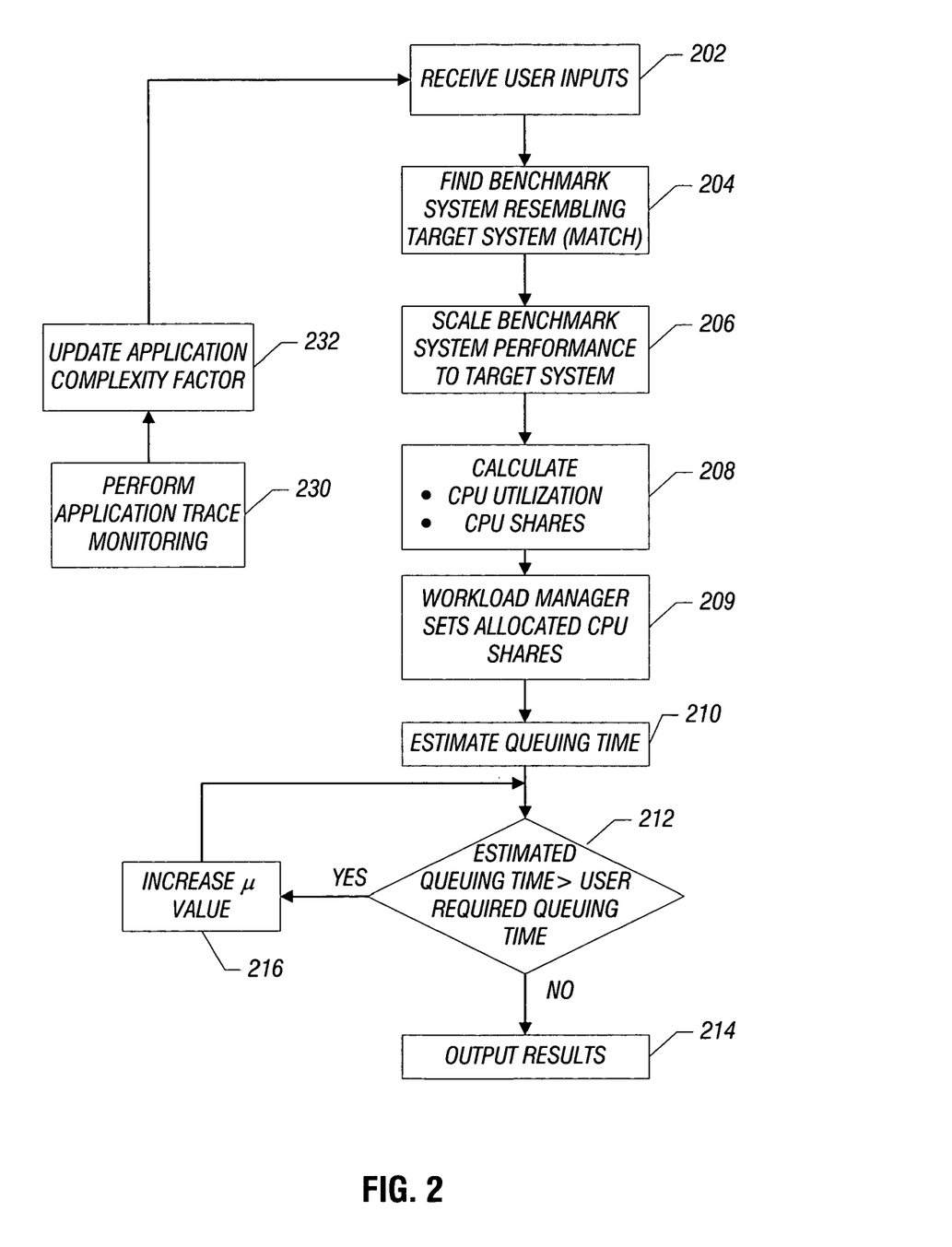
FIG. 2 is a flow diagram of a process performed by the capacity estimation module of FIG. 1 in accordance with an embodiment.

FIG. 2 shows a process performed by the capacity estimation module 102 and/or the workload manager 103 (FIG. 1), in accordance with an embodiment. The capacity estimation module 102 receives (at 202) user inputs to be used for performing the capacity estimation analysis for a target software application to be deployed on the target system 118. In accordance with an embodiment, the user inputs include: (1) the target system specification, which describes the hardware and software configuration of the target system 118; (2) business requirements, such as a user-specified transactions per second (TPS) (also referred to as "input TPS") for the target software application, or the number of concurrent users of the target software application; (3) an estimated application complexity factor, which is defined as the ratio of at least one of the workload complexity and source code efficiency of the target software application to a benchmark software application, which is a software application for which information is maintained in the benchmark database 112; and (4) user-specified queuing time (which is the waiting time associated with time a transaction spends in a queue plus processing time associated with processing the transaction by the target system). The above inputs are provided by the user in accordance with an embodiment. Note that in other embodiments, other types of inputs can alternatively or additionally be provided by a user to the capacity estimation module 102.

Based on the target system specification received at 202, the capacity estimation module 102 finds (at 204), in a matching task, a benchmark system (from among plural candidate benchmark systems) in the benchmark database 112 that most closely resembles the target system. A matching algorithm employed by the capacity estimation module 102 matches the following characteristics of the target system and benchmark system: (1) middleware version on CPU type, where "middleware version" refers to a version of middleware software (interface software between application software and CPU), and CPU type refers to a type of CPU used in the target system; (2) CPU speed (or CPU frequency); (3) number of CPUs per node; and (4) number of nodes. In one implementation, it is assumed that the number of CPUs is the same for each of the nodes (nodes 120 in FIG. 1) of the target system or benchmark system. In another implementation, different nodes can have different numbers of CPUs.

The "resemblance" of the benchmark system and target system is measured by a distance function that is lexicographic (priority-based). According to an embodiment, the resemblance is defined in the following priority order: (1) match the middleware version and CPU type exactly; (2) then match the number of CPUs per node as closely as possible; (3) then match the CPU frequency as closely as possible; and (4) then match the number of nodes as closely as possible.

If match condition (1) above produces multiple results (multiple candidate benchmark systems) or if match condition (1) is unable to identify any one benchmark system (that is, there is no benchmark system with exactly the same middleware version and CPU type as the target system), then match condition (2) is performed. Matching the number of CPUs according to match condition (2) is measured by the following distance metric $$d(\text{Target, Candidate}) = |\text{Target \#CPUs} - \text{Candidate \#CPUs}|. \quad \text{(Eq. 1)}$$

The parameter Target represents the target system, and the parameter Candidate represents a candidate benchmark system from among the candidate benchmark systems stored in the benchmark database 112. The parameter Target #CPUs indicates the number of CPUs in each node of the target system 118, and the parameter Candidate #CPUs represents the number of CPUs per node in the candidate benchmark system. The candidate benchmark system(s) is (are) selected from among the benchmark systems in the benchmark database 112 having the smallest distance value d(Target, Candidate) value. Note that several benchmark systems can have the same distance metric value, for condition (2), with respect to the target system 118.

Instead of using the distance metric of Eq. 1, the capacity estimation module 102, according to a different embodiment, can use the following distance metric:

$$d(\text{Target, Candidate}) = \left| \frac{\text{Target \#}CPUs - \text{Candidate \#}CPUs}{\text{Target \#}CPUs + \text{Candidate \#}CPUs} \right|. \quad \text{(Eq. 2)}$$

If multiple candidate benchmark systems still remain after matching the number of CPUs per node as closely as possible (match condition (2)), the capacity estimation module 102 tries to match the CPU frequency as closely as possible (match condition (3)). Finally, if multiple candidate benchmark systems still remain after match condition (3), the capacity estimation module 102 matches the number of nodes in the target system and candidate benchmark system as closely as possible (match condition (4)).

The reason for the above matching sequence is based on the difficulty in later extrapolating along the four sub-dimensions of the four matching conditions when scaling the known performance of the benchmark system to the target system. For example, it would be more difficult to extrapolate across different processor types (such as from a RISC (reduced instruction set computer) processor to an Intel Xeon processor) than to extrapolate across different number of CPUs or different number of nodes.

The matching task (at 204) selects a single benchmark system (referred to as the "baseline benchmark system") from among the multiple candidate benchmark systems, described by the four sub-dimensions, that has a known processing capacity (the published benchmark TPS or transactions per second). Usually, the baseline benchmark system is different from the target system. Consequently, the capacity estimation module 102 next performs scaling (at 206) to translate the performance of the baseline benchmark system to the target system. This scaling calculates a parameter Target TPS, which represents the estimated TPS of the target system scaled from the known TPS of the baseline system, according to the following formula:

Target TPS=(Baseline TPS)·(Target #CPUs/Baseline #CPUs)·$f^{log2(Target\ \#CPUs/Baseline\ \#CPUs)}$·(Target CPU Freq/Baseline CPU Freq)·$g^{log2(Target\ CPU\ Freq/Baseline\ CPU\ Freq)}$(Target #Nodes/Baseline #Nodes)·$h^{log2(Target\ \#Nodes/Baseline\ \#Nodes)}$ (Eq. 3)

where f, g and h are three efficiency factors for CPU scalability, CPU frequency (or clock speed) scalability, and nodes scalability. The parameter Baseline TPS refers to the known TPS of the baseline benchmark system; the parameter Baseline #CPUs refers to the number of CPUs per node of the baseline benchmark system; the parameters Target CPU Freq and Baseline CPU Freq refer to the operating frequencies or clock speeds of the CPUs of the target system and baseline benchmark system, respectively; and the parameters Target #Nodes and Baseline #Nodes refer to the number of nodes in the target system and baseline benchmark system, respectively.

According to one example implementation, default values (f=0.9, g=1, h=1.02) are obtained by statistical curve-fitting over published benchmark data. The base 2 log function $\log_2$(Target #CPUs/Baseline #CPUs) reflects the "doubling effect" based on the number of CPUs in a node—for example, if one doubles the number of CPUs in a node, the power term will be $f^{log_2(2)} = f^1 = f = 0.9$, and the processor throughput capacity will be 2*0.9=1.8, which is less than doubling. The efficiency factor of f=0.9 accounts for the overhead in multi-CPU systems.

The exponential term $\log_2$(Target #CPUs/Baseline #CPUs) represents the number of "doublings" needed to go from the baseline number of CPUs to target number of CPUs. For example, if the baseline number of CPUs is 2, and the target number of CPUs is 8, then $\log_2(8/2)=2$; in other words, two "doublings" occur when going from two to eight CPUs—the first "doubling" goes from two to four; and the second "doubling" goes from four to eight.

In Eq. 3 above, the product on the right side of (Baseline TPS) represents a speed factor, which is the ratio of the performance of the target system to the known performance of the baseline benchmark system. In other words, Target TPS=(Baseline TPS)·(speed factor). (Eq. 4)

The parameter Target TPS refers to the performance (or capacity), expressed in transactions per second, of the target system 118, scaled from the known TPS of the baseline system. The scaling factor is the speed factor.

To obtain the performance of the target software application on the target system, the known TPS (Baseline TPS) of the baseline system is multiplied by the speed factor, with the product then divided by the application complexity factor, then divided by (1+SSL Overhead %), then divided by (1+Clustering Overhead %), as follows:

$$\text{Target Software } TPS = \frac{(\text{Baseline } TPS) \cdot (\text{speed factor})}{(\text{application complexity factor}) \cdot (1 + SSL \text{ Overhead } \%) \cdot (1 + \text{Clustering Overhead } \%)}. \quad (Eq. 5)$$

The parameter Target Software TPS represents the performance (expressed as transactions per second in one embodiment) of the target software application on the target system. Note that the parameter Target Software TPS is computed based on information relating to the baseline benchmark system (including Baseline TPS and baseline benchmark system parameters used in calculating the speed factor). SSL refers to secure socket layer, and the parameter SSL Overhead % is the percentage of the overall overhead contributed by the secure socket layer of the target system. The parameter Clustering Overhead % refers to the percentage of the overall overhead contributed by multiple nodes in the target system. Note that overhead associated with the secure socket layer (SSL) and clustering are two examples of overhead that may affect performance of the target software application in the target system. In other implementations, other or alternative overhead parameters can be taken into account to calculate the estimated performance (or capacity) of the target software application.

The estimated performance of the target software application (Target Software TPS) represents the maximum projected performance of the target software application when deployed on the target system (assuming there are no other software applications executing on the target system). The maximum projected performance (Target Software TPS) is usually larger than the user-specified input performance (expressed in Input TPS) for the target software application. The user-specified input performance is received by the capacity estimation module 102 at step 202 in FIG. 2. If the value of Input TPS is larger than the value of the estimated performance of the target application on the target system (Target Software TPS), then the target system will have insufficient resources to provide the expected performance (indicated by Input TPS). In this case, the resources of the target system will have to be expanded.

The ratio of the user-specified input performance (Input TPS) to the estimated performance (Target Software TPS) produces (at 208) a CPU Utilization parameter, calculated by the capacity estimation module 102 according to Eq. 6 below.

$$CPU \text{ Utilization} = \frac{\text{Input } TPS}{\text{Target Software } TPS}.$$

The CPU Utilization parameter represents the utilization (as a percentage value) of resources (e.g., CPUs) of the target system based on the estimated performance of the target software application on the target system, assuming that the entire target system is available to the target software application (that is, the target software application is not being shared with other software applications).

The CPU Utilization parameter is a percentage value (less than one) that indicates the percentage of the CPUs available in the target system that should be allocated to the target software application to satisfy the user-input TPS requirement (Input TPS). The CPUs available in the target system are the number of CPUs per node multiplied by the number of nodes. From the CPU Utilization parameter, the capacity estimation module 102 also computes (at 208) a CPU Shares parameter, according to Eq. 7 below. A CPU share represents $\frac{1}{100}^{th}$ of a CPU.

CPU Shares=CPU Utilization*Target #Nodes*
Target #CPUs*100. (Eq. 7)

The parameter CPU Shares represents the number of CPU shares that should be allocated to the target software application to meet the Input TPS requirement of the user. The number of CPU shares is an example of a metric indicating a share of processing capacity allocated to a particular software application. Since the CPU Shares parameter is based on CPU Utilization, the CPU Shares parameter also represents a minimum value for the CPU shares that are to be allocated to the target software application to satisfy user requirements. In practice, the workload manager 103 allocates (at 209) a portion of the total system capacity to the target software application, by setting the value of a parameter WLM_CPU_Shares, which is usually larger than the value of CPU Shares according to Eq. 7. The workload manager 103 allocates a larger value for WLM_CPU_Shares to increase the likelihood that sufficient resources will be allocated to the target software application.

The CPU Utilization, CPU Shares, and WLM_CPU_Shares parameters produced (at 208 and 209) are examples of parameters that represent the resource utilization requirements (or capacity requirements) of the target software application.

Figure 3:
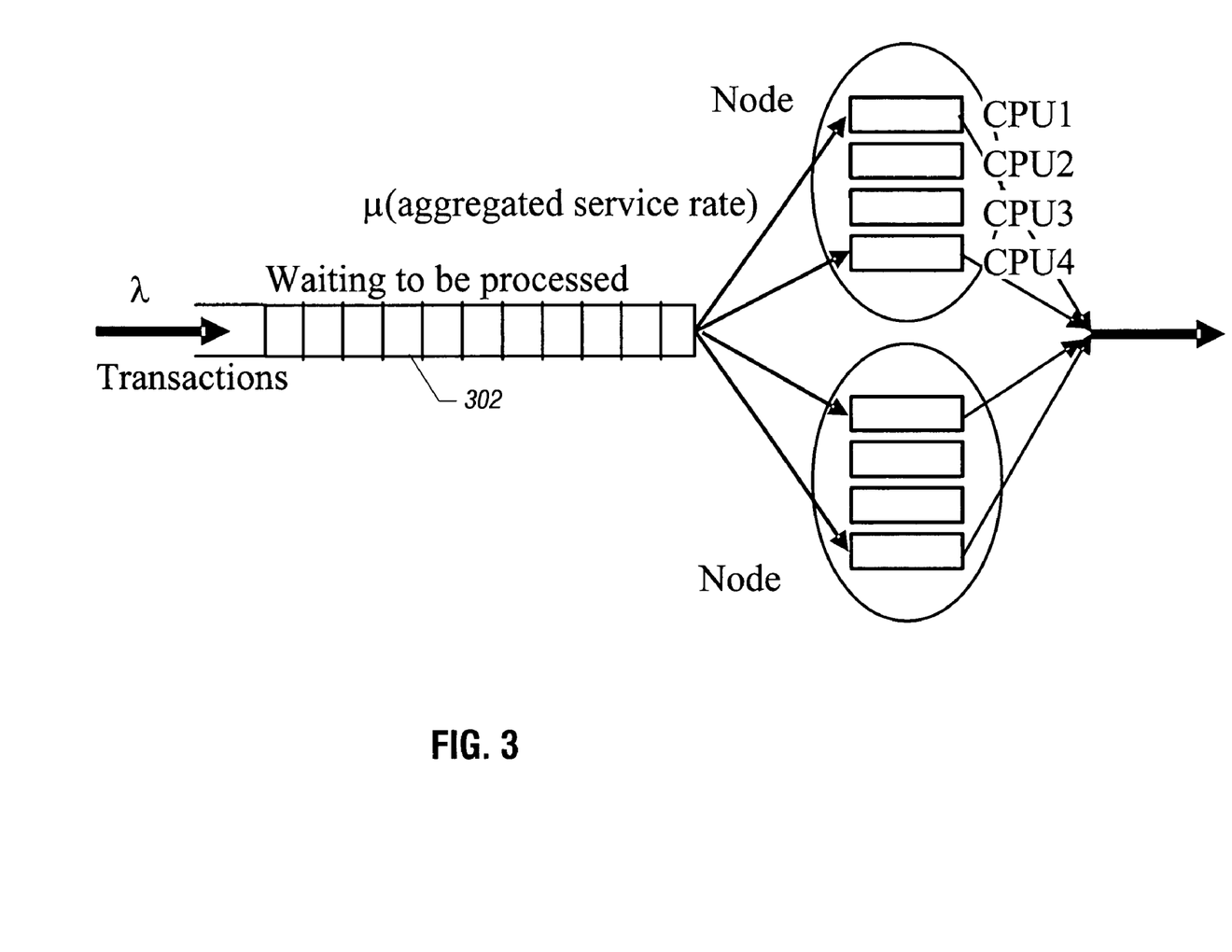
FIG. 3 illustrates a queuing model for estimating queuing time, in accordance with an embodiment.

The capacity estimation module 102 next estimates (at 210) the queuing time associated with execution of the target software application on the target system. The queuing time is the sum of the waiting time and actual processing time. Since the queuing time is part of the user experienced response time (the other parts of the user experienced response time include queuing time at a web server, queuing time at a database server, network switching delays, and network transport and access time), the estimation of queuing time is useful in the overall evaluation of target system performance. The queuing model is depicted in FIG. 3, which represents the target system as a single-queue, multiple-CPU system. The queue is represented as 302. According to one embodiment, the following assumptions are made with respect to the queuing model: a Poisson arrival stream of transactions, exponential service times, and multiple parallel CPUs. For waiting time, the multiple CPUs are collectively considered as being a single, aggregated server whose capacity equals the sum of the capacities of the individual CPUs. The result is an M/M/1 queue associated with a waiting time $W_q$ calculated by the following equation:

$$W_q = \rho(\mu-\lambda) = [\rho^2/(1-\rho)]/\lambda, \quad \text{(Eq. 8)}$$

where $\lambda$ is the arrival rate of transactions into the queue 302 (the arrival rate being equal to Input TPS), $\mu$ is the aggregated service rate of the multiple CPUs, which is equal to the fraction of the estimated performance of the target application on the target system (expressed as parameter Target Software TPS) assigned by the workload manager 103 (FIG. 1) to the target software application. The value of $\mu$ is selected by the workload manager 103 based on a percentage computed by the workload manager as being an optimal resource allocation for the target software application. The fraction of Target Software TPS selected as the value of $\mu$ is based in part on the number of software applications that are expected to be deployed on the target system. The parameter $\rho$ is calculated as $\rho=\lambda/\mu$, where $\rho$ represents utilization. Note that, since the workload manager 103 assigns no more than all CPU Shares of the system to the target software application, $\rho$ represents CPU utilization that is no less than the value of the CPU Utilization parameter calculated by the capacity estimation module 102 according to Eq. 6 above.

The second component of queuing time is the processing time on the CPUs. Since it is assumed that a transaction will be processed on one of multiple parallel CPUs, each CPU has a service rate that is equal to $$\mu/(\text{Target \#CPUs} * \text{Target \#Nodes}).$$

The average processing time of the single, aggregate server is calculated as:

$$\frac{\text{Target \#CPUs} * \text{Target \#Nodes}}{\mu} = \frac{\text{Target \#CPUs} * \text{Target \#Nodes}}{\lambda/\rho}$$

The total queuing time is the sum of the waiting time and the processing time, defined by the following equation:

$$R = \rho^2/(1-\rho)/\lambda + (\text{Target \#CPUs}) \cdot (\text{Target \#Nodes}) \cdot (\rho/\lambda). \quad \text{(Eq. 9)}$$

If the computed utilization percentage ($\rho$) is greater than or equal to one, then the queuing time is set to infinity. The utilization $\rho$ greater than one indicates an unstable queue.

The capacity estimation module 102 next determines (at 212) whether the estimated queuing time is greater than a user-specified queuing time (received at 202). If not, then the various parameters described above (e.g., $\rho$, $\mu$, R, CPU Utilization, CPU Shares, WLM_CPU_Shares) are output to the user (at 214). However, if the estimated queuing time is greater than the user required queuing time, which means that insufficient resources may have been allocated to the target software application, the workload manager 103 increases (at 216) the value of $\mu$ by increasing the fraction of Target Software TPS to allocate to the target software application (in other words, a larger fraction of the resources of the target system is allocated by the workload manager 103 to the target software application). Increasing $\mu$ causes a decrease in $\rho$. In light of the increased value of $\mu$, the queuing time is then estimated again (at 210), and another determination is made to determine whether the estimated queuing time exceeds the user-specified queuing time.

As noted above, one of the inputs to the capacity estimation module 102 is the application complexity factor. The input provided by the user is an estimated input that may or may not be accurate. To increase the accuracy of the analysis performed by the capacity estimation module 102, a feedback loop (230 and 232) is provided. In the feedback loop, the application trace monitoring task 108 performs (at 230) an application trace to trace the execution of the target software application on the target system 118 (after the target software application has been deployed on the target system). The performance-related parameters of the target software application as it executes on the target system 118 are provided to the capacity estimation module 102, which updates (at 232) the application complexity factor based on the performance-related parameters. As noted above, the application complexity factor is the ratio of workload complexity and source code efficiency of the target software application to the benchmark application. The performance-related parameters that are monitored by the application trace monitoring task 108 are used to determine whether the assumption of workload complexity and source code efficiency is accurate. The updated (or verified) application complexity factor can be used for determining capacity estimation for future projects, such as deployment of the target software application on an expanded target system.

Instructions of software described herein (such as the capacity estimation module 102, application trace monitoring task 108, and workload manager 103) are executed on one or more processors (such as CPUs 104 in FIG. 1). The processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks;

other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
   receiving, by one or more processors, user input regarding a target system on which a software application is to be deployed;
   matching, by the one or more processors, a benchmark system from plural candidate benchmark systems to the target system, wherein the matching is based on comparing each of the candidate benchmark systems to the target system that includes at least one of:
      comparing a processor type of each candidate benchmark system with a processor type of the target system;
      comparing a processor speed of each candidate benchmark system with a processor speed of the target system;
      comparing a number of CPUs per node of each candidate benchmark system with a number of CPUs per node of the target system; and
      comparing a number of nodes of each candidate benchmark system with a number of nodes of the target system; and
   computing, by the one or more processors, an estimated performance of the software application on the target system based on scaling of performance of the matched benchmark system to the target system, wherein computing the estimated performance of the software application on the target system is further based on an application complexity factor, wherein the application complexity factor is based on a relationship of at least one of workload complexity and source code efficiency of the software application to a benchmark software application.

2. The method of claim 1, further comprising computing a share of a processing capacity to allocate the software application based on the computed estimated performance of the software application.

3. The method of claim 2, wherein receiving the user input comprises receiving a first parameter relating to a user-specified performance of the software application on the target system, and
   wherein computing the share of the processing capacity is based on a ratio of the first parameter to the computed estimated performance.

4. The method of claim 1, wherein matching the benchmark system from the plural candidate benchmark system to the target system includes selecting a benchmark system from the plural candidate benchmark systems that most closely resembles the target system, based at least on one or more of factors including the processor type, processor speed, number of CPUs per node, and number of nodes.

5. The method of claim 1,
   wherein scaling the performance of the matched benchmark system to the target system is based on a ratio of the number of processors per node in the target system to the number of processors per node in the matched benchmark system, a ratio of the processor speed of the target system to the processor speed of the matched benchmark system, and a ratio of the number of nodes in the target system to the number of nodes in the matched benchmark system.

6. The method of claim 5, further comprising multiplying each of the ratios by a respective one of plural efficiency factors.

7. The method of claim 1, wherein matching the benchmark system from the plural candidate benchmark systems to the target system comprises matching the benchmark system to the target system in a priority-based order as follows:
   match the processor type of the benchmark system with the processor type of the target system;
   then match the processor speed of the benchmark system with the processor speed of the target system;
   then match the number of CPUs per node of the benchmark system with the number of CPUs per node of the target system;
   then match the number of nodes of the benchmark system with the number of nodes of the target system.

8. The method of claim 1, wherein the target system includes hardware and each of the plural candidate benchmark systems includes corresponding hardware, and wherein matching the benchmark system from the plural candidate benchmark systems to the target system is based on comparing the hardware of the target system to the hardware of the corresponding candidate benchmark systems.

9. An article comprising at least one storage medium containing instructions that when executed cause a system to:
   receive user input regarding a target system on which a software application is to be deployed;
   access a database containing information relating to plural candidate benchmark systems;
   select a benchmark system from the plural candidate benchmark systems, the selected benchmark system resembling the target system, wherein selecting the benchmark system is based on comparing each of the candidate benchmark systems to the target system that includes at least one of:
      comparing a processor type of each candidate benchmark system with a processor type of the target system;
      comparing a processor speed of each candidate benchmark system with a processor speed of the target system;
      comparing a number of CPUs per node of each candidate benchmark system with a number of CPUs per node of the target system; and
      comparing a number of nodes of each candidate benchmark system with a number of nodes of the target system; and
   compute an estimated performance of the software application on the target system based on scaling of performance of the selected benchmark system to the target system, wherein computing the estimated performance of the software application on the target system is further based on an application complexity factor, wherein the application complexity factor is based on a relationship of at least one of workload complexity and source code efficiency of the software application to a benchmark software application.

10. The article of claim 9, wherein computing the estimated performance of the software application comprises computing the estimated performance of the software application on a shared target system on which the software application and at least another software application is executable.

11. The article of claim 9, wherein computing the estimated performance comprises computing the estimated performance of the software application on the target system based on an assumption that the resources of the target system are not shared with other software applications.

12. The article of claim 9, wherein the instructions when executed cause the system to further:
calculate a queuing time expected to be experienced by a user based on the estimated performance of the software application.

13. The article of claim 12, wherein calculating the queuing time includes using a single-queue, multiple-CPU model.

14. The article of claim 12, wherein calculating the queuing time comprises summing a waiting time and a processing time, wherein the waiting time includes time delay in a queue, and wherein the processing time includes a time for processing transactions by the target system.

15. The article of claim 14, wherein calculating the waiting time is based on an estimated performance of the software application on the target system.

16. The article of claim 9, wherein the instructions when executed cause the system to further:
receive at least one user-input parameter that is used to compute the estimated utilization;
monitor performance of the software application after deployment of the software application on the target system; and
adjust the at least one user-input parameter based on the monitoring.

17. The article of claim 9, wherein the target system includes hardware and each of the plural candidate benchmark systems includes corresponding hardware, and wherein selecting the benchmark system from the plural candidate benchmark systems is based on comparing the hardware of the target system to the hardware of the corresponding candidate benchmark systems.

18. A system comprising:
a benchmark database containing information pertaining to plural candidate benchmark systems; and
one or more processors configured to:
receive user input regarding a target system on which a software application is to be deployed;
select a benchmark system from among the plural benchmark systems in the benchmark database that most closely resembles the target system, wherein selecting the benchmark system is based on comparing each of the candidate benchmark systems to the target system that includes at least one of:
comparing a processor type of each candidate benchmark system with a processor type of the target system;
comparing a processor speed of each candidate benchmark system with a processor speed of the target system;
comparing a number of CPUs per node of each candidate benchmark system with a number of CPUs per node of the target system; and
comparing a number of nodes of each candidate benchmark system with a number of nodes of the target system; and
calculate an estimated performance of the software application on the target system based on scaling performance of the selected benchmark system to the target system, wherein calculating the estimated performance of the software application on the target system is further based on an application complexity factor, wherein the application complexity factor is based on a relationship of at least one of workload complexity and source code efficiency of the software application to a benchmark software application.

19. The system of claim 18, wherein the one or more processors are configured to scale the performance of the selected benchmark system to the target system based on at least one of: comparing processor types in the selected benchmark system and target system; comparing middleware versions in the selected benchmark system and target system; comparing processor speeds in the selected benchmark system and target system; comparing numbers of processors per node in the selected benchmark system and target system; and comparing numbers of nodes in the selected benchmark system and target system.

20. The system of claim 18, the one or more processors configured to further:
receive a user-input performance of the software application on the target system; and
calculate resource utilization based on a ratio of the user-input performance to the estimated performance.

21. The system of claim 20, the one or more processors configured to calculate CPU shares of the target system for allocating the software application based on the calculated resource utilization.

22. The system of claim 18, the one or more processors configured to further calculate a queuing time based on the estimated performance.

23. The system of claim 22, the one or more processors configured to further compare the calculated queuing time with a user-input queuing time, and in response to detecting that the calculated queuing time is greater than the user-input queuing time, adjust a parameter that affects the queuing time of the software application.

24. The system of claim 18, wherein the target system includes hardware and each of the plural benchmark systems includes corresponding hardware, and wherein the benchmark system selected from among the plural benchmark systems is based on comparing the hardware of the target system to the hardware of the corresponding benchmark systems.

25. A method comprising:
receiving, by one or more processors, user input regarding a target system on which a first software application is to be deployed, wherein the target system is a shared system on which the first software application and at least another software application is executable;
accessing, by the one or more processors, a database containing information relating to plural candidate benchmark systems;
selecting, by the one or more processors, a benchmark system from the plural candidate benchmark systems by comparing each of the candidate benchmark systems to the target system that includes at least one of:
comparing a processor type of each candidate benchmark system with a processor type of the target system;
comparing a processor speed of each candidate benchmark system with a processor speed of the target system;
comparing a number of CPUs per node of each candidate benchmark system with a number of CPUs per node of the target system; and
comparing a number of nodes of each candidate benchmark system with a number of nodes of the target system; and computing an estimated performance of the first software application on the target system based on scaling of the performance of the selected benchmark system to the target system, wherein computing the estimated performance of the first software application on the target system is further based on an application complexity factor, wherein the application complexity factor is based on a relationship of at least one of workload complexity and source code efficiency of the first software application to a benchmark software application.

* * * * *